United States Patent
Danyluk et al.

(10) Patent No.: US 9,892,379 B1
(45) Date of Patent: Feb. 13, 2018

(54) MONITORING AND NOTIFICATION OF DELIVERED PACKAGES

(71) Applicant: INTERNATIONAL BUSINESS MACHINES CORPORATION, Armonk, NY (US)

(72) Inventors: Nicholas G. Danyluk, Poughkeepsie, NY (US); Eli M. Dow, Wappingers Falls, NY (US); Kavita Sehgal, Poughkeepsie, NY (US); Diane M. Stamboni, Pleasant Valley, NY (US); Sneha M. Varghese, Fishkill, NY (US); John S. Werner, Fishkill, NY (US); Sarah Wu, Kingston, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/590,118

(22) Filed: May 9, 2017

(51) Int. Cl.
*G08B 13/14* (2006.01)
*G06Q 10/08* (2012.01)
*G08B 13/196* (2006.01)

(52) U.S. Cl.
CPC ..... *G06Q 10/0833* (2013.01); *G06Q 10/0832* (2013.01); *G08B 13/1472* (2013.01); *G08B 13/19608* (2013.01); *G08B 13/19652* (2013.01)

(58) Field of Classification Search
CPC .......... G06Q 10/0833; G06Q 10/0832; G08B 13/1472; G08B 13/19608; G08B 13/19652; H04W 4/02; H04W 4/046; B65G 1/137
USPC ............. 340/568.1, 611, 66, 665, 661, 686.1
See application file for complete search history.

(56) References Cited

U.S. PATENT DOCUMENTS

| | | | |
|---|---|---|---|
| 9,469,476 B1* | 10/2016 | Ashoori | H04W 4/02 |
| 2003/0006275 A1 | 1/2003 | Gray | |
| 2015/0145643 A1 | 5/2015 | Fadell et al. | |
| 2016/0068264 A1* | 3/2016 | Ganesh | G08G 5/0069 701/2 |

(Continued)

FOREIGN PATENT DOCUMENTS

JP  2002325676 A  11/2002

OTHER PUBLICATIONS

Disclosed Anonymously "Secure Drone Packae Delivery Port", ip.com; IPCOM000246083D; Publication Date: May 3, 2016; 6 pgs.

*Primary Examiner* — George Bugg
*Assistant Examiner* — Anthony D Afrifa-Kyei
(74) *Attorney, Agent, or Firm* — Cantor Colburn LLP; Steven Chiu

(57) ABSTRACT

Methods, systems and computer program products for monitoring delivered packages are provided. Aspects include receiving, from a shipping information system, a first notification of an expected delivery of a package and responsively activating a smart mat and monitoring the smart mat for a delivery of the package, the delivery being indicated by a change in a weight measured by the smart mat. Aspects also include activating a camera to capture one or more images of the smart mat and the package based at least in part on detecting a change in the weight measured by the smart mat after the delivery. Aspects further include notifying one or more individuals with a second notification based on a determination that the package has been removed from the smart mat by analyzing the one or more images.

20 Claims, 6 Drawing Sheets

(56) References Cited

U.S. PATENT DOCUMENTS

2017/0011605 A1     1/2017   Grabham
2017/0032637 A1     2/2017   Harrison et al.

\* cited by examiner

MONITORING AND NOTIFICATION OF DELIVERED PACKAGES

BACKGROUND

The present invention relates generally to systems, methods, and computer program products for monitoring delivered packages and, more specifically, to monitoring delivered packages and providing notifications when a delivered package is moved.

With the advent of online shopping, the number of packages that are delivered to individuals in recent years has dramatically increased. In many cases, packages are delivered to an individual when they are not home and left unattended outside their residence, which creates an opportunity for other individuals to steal the packages. The theft of packages often results in financial losses and can also increase the risk of being a victim of identity theft as many packages contain personal information that can be used to steal the intended recipient's identity.

Current package delivery tracking systems allow an intended recipient of a package to determine when a package has been delivered, but these systems are not able to notify an intended recipient if a delivered package has been stolen or tampered with.

SUMMARY

Embodiments include computer-implemented methods, systems, and computer program products for monitoring delivered packages. Aspects include receiving, from a shipping information system, a first notification of an expected delivery of a package and responsively activating a smart mat and monitoring the smart mat for a delivery of the package, the delivery being indicated by a change in a weight measured by the smart mat. Aspects also include activating a camera to capture one or more images of the smart mat and the package based at least in part on detecting a change in the weight measured by the smart mat after the delivery. Aspects further include notifying one or more individuals with a second notification based on a determination that the package has been removed from the smart mat by analyzing the one or more images.

Additional features are realized through the techniques of the present invention. Other embodiments and aspects of the invention are described in detail herein and are considered a part of the claimed invention. For a better understanding of the invention with the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features of embodiments of the invention are apparent from the following detailed description taken in conjunction with the accompanying drawings in which:

Figure 1A:
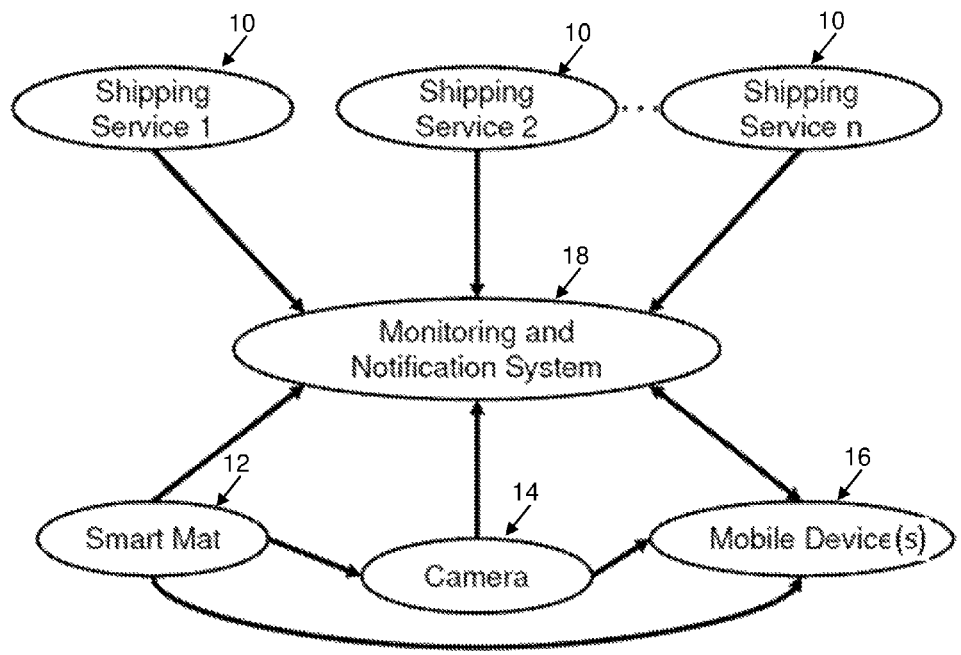
FIG. 1A depicts a block diagram of a system for monitoring delivered packages in accordance with an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Embodiments include systems, methods and computer program products for monitoring delivered packages. In exemplary embodiments, a monitoring and notification system is configured to obtain information regarding an expected delivery of a package from a shipping service and to activate a smart mat shortly before the package is expected to be delivered. The smart mat determines when the package has been delivered by identifying a change in a weight of items on the smart mat. After the package is delivered, the smart mat is configured to determine if the package has been removed by identifying a subsequent change in the weight of the items on the smart mat. Based on a determination that the package has been removed, one or more images of the smart mat and the package are analyzed to determine whether the package was removed or tampered with by a person or if the package blew away due to weather conditions (e.g. high winds) or was moved by an animal or some other object. If it is determined that the package was removed by a person, a notification of a potentially stolen package is created.

Referring now to FIG. 1A, a block diagram of a system for monitoring delivered packages in accordance with an embodiment of the present invention is shown. As shown, the system includes a plurality of shipping services 10 that are in communication with a monitoring and notification system 18. In exemplary embodiments, the monitoring and notification system 18 can access the shipping services via application programming interfaces (APIs) to obtain information regarding packages scheduled for delivery. The monitoring and notification system 18 is also in communication with a smart mat 12, a camera 14, and a plurality of mobile devices 16. In exemplary embodiments, the monitoring and notification system 18 can be embodied in a processing system such as the one shown in FIG. 2. The smart mat 12 is configured to monitor the weight of items disposed on the smart mat 12 and to communicate any changes in the weight of items disposed on the smart mat 12 to the monitoring and notification system 18. The camera 14 is configured to capture images of the area in which the smart mat 12 is disposed, such that it can capture images that show the packages on the smart mat 12 and any condition that may cause the package to move off the smart mat 14, such as person that tampers with or removes a package, weather conditions, animals, etc. In exemplary embodiments, the monitoring and notification system 18 is configured to selectively activate the smart mat 12 and the camera 14.

In exemplary embodiments, the monitoring and notification system 18 is in communication with a mobile device 16, such as a smartphone or a tablet. The monitoring and notification system 18 provides notifications to the mobile device 16 regarding the delivery of a package and regarding tampering or removal of a package from the smart mat 12. In exemplary embodiments, the notification can include images captured by the camera 14, data captured from the smart mat 12, and information received from the shipping services 10. In exemplary embodiments, the camera 14 and/or smart mat 12 can be accessed directly by the mobile device 16. In exemplary embodiments, multiple mobile devices 16 can be associated with a smart mat 12 such that all members of a household can monitor delivery of packages.

Figure 1B:
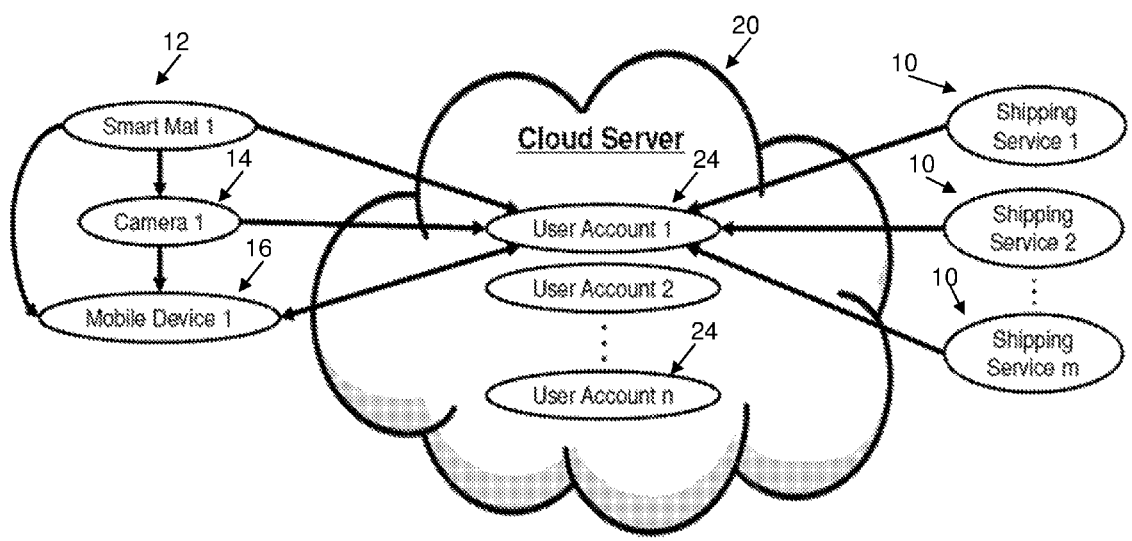
FIG. 1B depicts a block diagram of a cloud-based system for monitoring delivered packages in accordance with another embodiment of the present invention.

FIG. 1B depicts a block diagram of a cloud system for monitoring delivered packages in accordance with another embodiment of the present invention. The system includes a cloud server 20 that stores multiple user accounts 24. In exemplary embodiments, the cloud server 20 is configured to communicate with the smart mat 12, the camera 14, and a mobile device 16 associated with one of the user accounts 24. The data received from the smart mat 12 and the camera 14 is analyzed on the cloud server 20. In addition, the cloud server 20 is configured to receive data regarding anticipated deliveries from one or more shipping services 10. In exemplary embodiments, users can link their shipping service accounts to their personal user account 24. In one embodiment, users can connect to their user account 24 on the cloud server 20 using their mobile device 16. Likewise, a user can also connect directly to the smart mat 12 and camera 14 via their mobile device 16.

Figure 2:
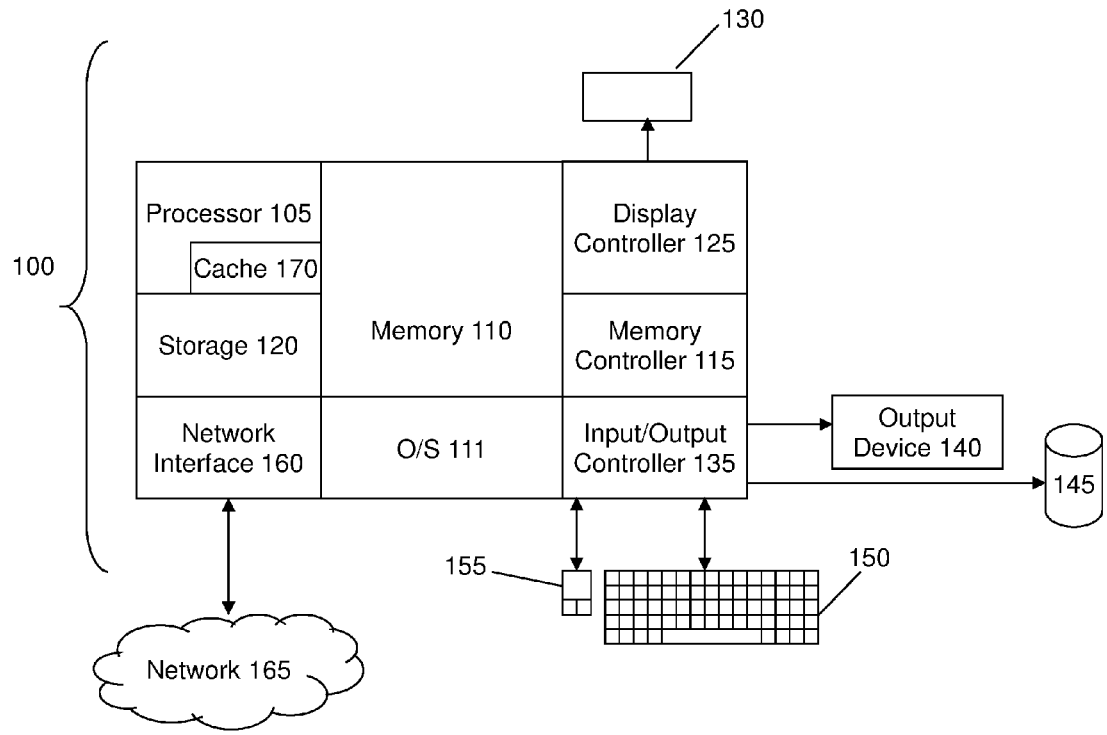
FIG. 2 depicts a block diagram of a processing system in accordance with an embodiment of the present invention.

FIG. 2 illustrates a block diagram of a processing system 100 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer, such as a personal computer, workstation, minicomputer, or mainframe computer.

In some embodiments, as shown in FIG. 2, the processing system 100 includes a processor 105, a memory 110 coupled to a memory controller 115, and one or more input devices 145 and/or output devices 140, such as peripheral or control devices that are communicatively coupled via a local I/O controller 135. These devices 140 and 145 may include, for example, battery sensors, position sensors, cameras, microphones and the like. Input devices such as a conventional keyboard 150 and mouse 155 may be coupled to the I/O controller. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor, a semiconductor based microprocessor (in the form of a microchip or chip set), a macroprocessor, or other device for executing instructions. The processor 105 includes a cache 170 that can be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read-only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The processing system 100 may further include a display controller 125 coupled to a user interface or display 130. In some embodiments, the display 130 may be an LCD screen. In some embodiments, the processing system 100 may further include a network interface 160 for coupling to a communications network 165. The network 165 may be an IP-based network for communication between the processing system 100 and an external server, client and the like via a broadband connection. In some embodiments, the network 165 may be a managed IP network administered by a service provider. The communications network 165 may be implemented in a wireless fashion, e.g., using wireless protocols and technologies, such as WiFi, WiMax, satellite, etc. The communications network 165 may also be a packet-switched network such as a local area network, wide area network, metropolitan area network, the Internet, or other similar type of network environment. The communications network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in the processing system 100, such as that illustrated in FIG. 2.

Figure 3:
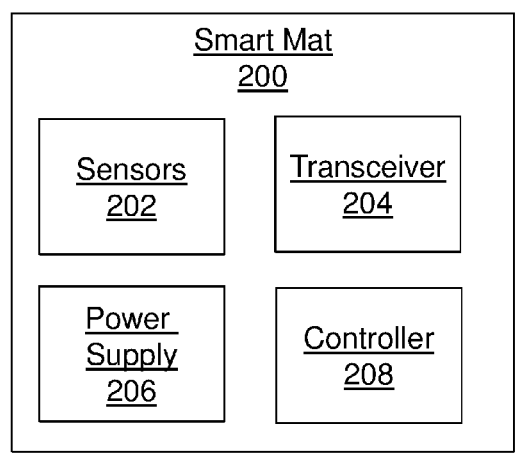
FIG. 3 depicts a block diagram of a smart mat used for monitoring delivered packages in accordance with an embodiment of the present invention.

Referring now to FIG. 3 a block diagram of a smart mat 200 used for monitoring delivered packages in accordance with an embodiment of the present invention is shown. As shown, the smart mat 200 includes one or more sensors 202 that are configured to collect data regarding the weight of objects placed on the smart mat 202. The smart mat 200 includes a controller 208 which receives signals from the sensors 202 and calculates any change in the weight of the objects placed on the smart mat 200. The smart mat 200 also includes a transceiver 204 in communication with the controller 208. The transceiver 204 is configured to permit communication between the smart mat 200 and a variety of other devices, such as a camera, a mobile device, a processing system, a cloud server, or the like. The smart mat 200 also includes a power supply 206 that is configured to provide power to the sensors 202, the transceiver 204 and to the controller 208.

Figure 4:
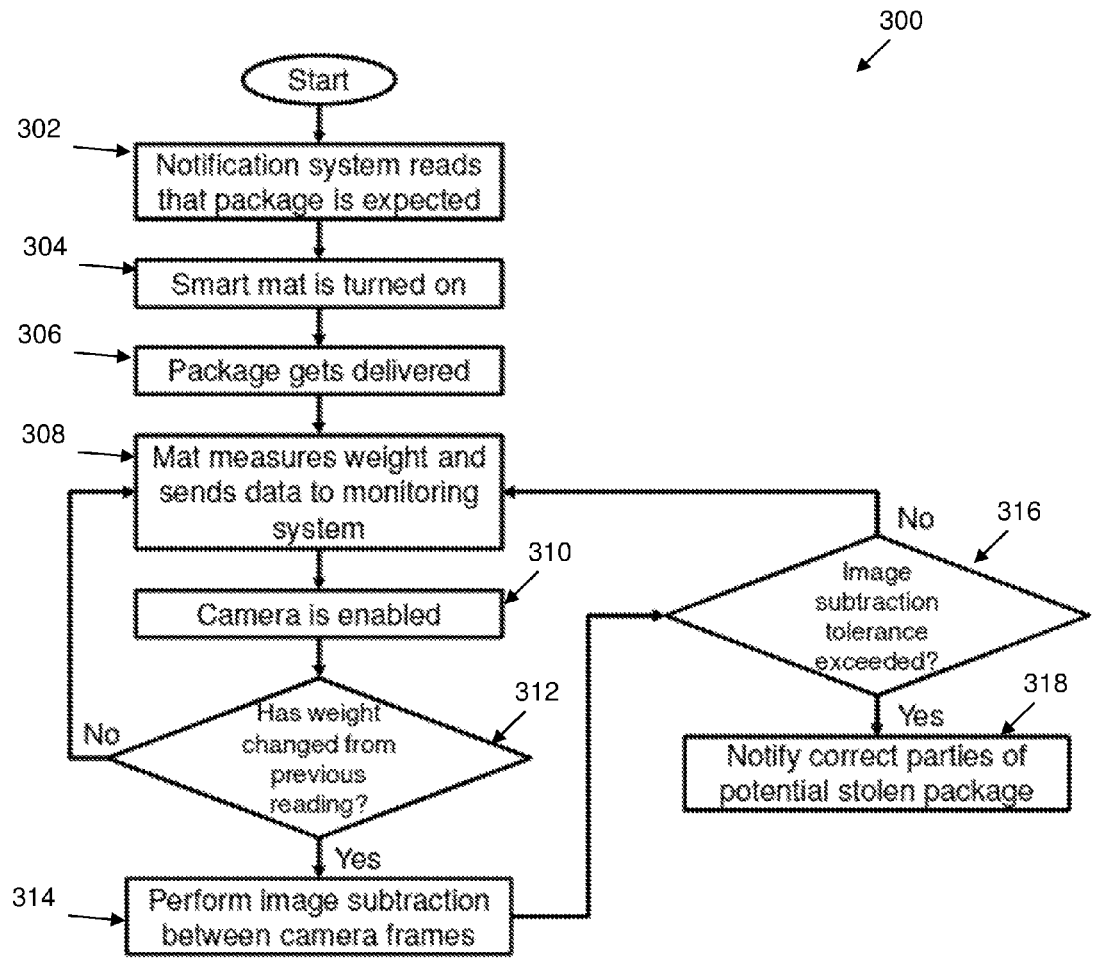
FIG. 4 depicts a flow diagram of a method for monitoring delivered packages in accordance with an embodiment of the present invention.

Referring now to FIG. 4 a flow diagram of a method 300 for monitoring delivered packages in accordance with an embodiment of the present invention is shown. As shown at block 302, the method 300 includes a notification system receiving an indication that a package is expected to be delivered. Next, at block 304, the smart mat is turned on by the notification system. The package is delivered and placed on the smart mat, as shown at block 306. Next, at block 308, the smart mat measures the weight of the delivered package and sends this information to the notification system. Next, as shown at block 310, the method includes ensuring that the camera is enabled. In exemplary embodiments, the changing of weight on the smart mat upon initial delivery can activate the camera.

As shown at decision block 312, it is determined if the weight indicated by the smart mat has changed from a previous reading. If the weight has not changed, the method 300 returns to block 308. Otherwise, the method 300 proceeds to block 314 and performs an image subtraction between images captured by the camera from before and after the weight change. Next, at decision block 316 it is determined if the image subtraction has exceeded a tolerance level, which indicates a substantial change in the images. If the image subtraction has exceeded a tolerance level, the method proceeds to block 318 and notifies one or more parties of a potentially stolen package. In exemplary embodiments, the tolerance level for the image subtraction analysis is used to determine the presence of a large change between the two images, such as the presence of a person in one of the two images or the removal of the package. If the image subtraction has not exceeded a tolerance level the method 300 returns to block 308.

In exemplary embodiments, the smart mat can be configured to compare the weight of a package placed on the smart mat to an expected package weight that is received from a shipping information system. This weight verification of a package can be used to detect the possible delivery of the wrong item or potential missing parts within the package. In exemplary embodiments, since the smart mat is linked to shippers tracking systems, the smart mat can be turned on only when a package is expected to save on power. The system could also be integrated into the online ordering process to potentially retrieve more information about the product being delivered.

In exemplary embodiments, the camera associated with a smart mat that is expecting a delivery can be activated in advance of the delivery, rather than when the package is placed on the smart mat. Activating the camera before the package is delivered, may prevent someone from attempting to remove a package between when smart mat detects a weight change and when the camera turns on. In some embodiments, the activation of the camera in advance of delivery can be based on the value of the item being delivered. For example, a user may prefer that a package having a higher value be monitored more closely than a lower value one.

In exemplary embodiments, image analysis can be applied to one or more images captured by the camera to determine the shape of the delivered packages and compare it to the expected package size in the shipping information system. For example, by coupling the smart mat and camera, an approximate density of the package can be calculated and it can be compared with the shippers tracking system to easily identify products. The image analysis can be used to identify and distinguish different packages if multiple are expected to be delivered together. In addition, the image analysis can be used to help distinguish between a delivered package and some other item that may be on the smart mat (e.g., neighbor's dog, newspaper, etc.).

In exemplary embodiments, after a package has been delivered it can be monitored to determine when it is moved. The movement of the package can be detected in two ways. First, movement can be determined based on the smart mat detecting a change in the weight of the objects on the smart mat. A determination that the weight has decreased can indicate that the package may have been moved or stolen. A determination that the weight has increased can indicate that either a new package was delivered or something else is on the mat (e.g., neighbor's dog, newspaper, etc.).

Next, movement can be determined based on analysis of images captured by the camera. In one embodiment, the camera can use image subtraction between video frames to detect if one or more of the packages have moved and whether something else entered the frame causing the movement. For example, pixel values from a second camera frame P2 can be subtracted from pixel values from a first camera frame P1 to create a new image Q that contains only the differences between the two frames. If Q is above a predefined threshold (e.g., 5% of pixels in the frame have changed and they are located in a centralized area) and the weight on the smart mat has changed, it can be assumed an item was either added or removed from the smart mat. In exemplary embodiments, the threshold can vary based on package density (otherwise small packages may not change enough pixels to exceed the threshold). The threshold is set for Q to discount expected frame changes such as tree leaves shifting due to wind or cars driving by on a street that happens to be in the field of view.

In exemplary embodiments, users can receive notifications through a mobile application upon receipt of a package and immediately upon movement of the package above a given threshold. In one embodiment, a user can view a live video feed from the camera associated with the smart mat on their mobile device to determine if they need to notify authorities regarding a potentially stolen package. In exemplary embodiments, a user profile can be used to determine when, how, and where to send notifications regarding packages. In general, notifications can also be sent to a delivery company, an original vendor, or product manufacturer upon detection of a wrong package or a package that is missing parts. The user profile can include various thresholds based on package value and image subtraction data that can be used to automatically notify certain parties without user interaction. In one example, users can set a package value threshold of less than $100 to notify only themselves and a package value threshold of greater than $1000 to notify authorities directly. In addition, the user profile can include different threshold values for when the image analysis indicates the detection of a human figure along with box movement.

In exemplary embodiments, the user receives a notification prior to direct notification of authorities if their mobile device (or other mobile devices previously linked to the system) is in the proximity of their home (via Bluetooth, wi-fi, etc.). Such a rule can be used to avoid notifying the authorities if the homeowner moves their package when they return home. The authorities may still be notified if desired in case the user is home but did not know a package was delivered and they ignore notifications.

In exemplary embodiments, while the camera is on, a portion of memory can be used to record a short video loop (e.g., 5 minutes). The video loop can continuously overwrite itself until package movement is detected at which time it will save the current loop as well as the next loop length (i.e., if loop length was set to 5 minutes, the user would be able to view the 5 minutes leading up to package movement as well as 5 minutes after package movement). Such a video loop system allows the user to see exactly what happened to their package and whether or not to alert authorities or send the saved video to authorities. In addition, the video loop system reduces the amount of storage space required for storing captured video.

Figure 5:
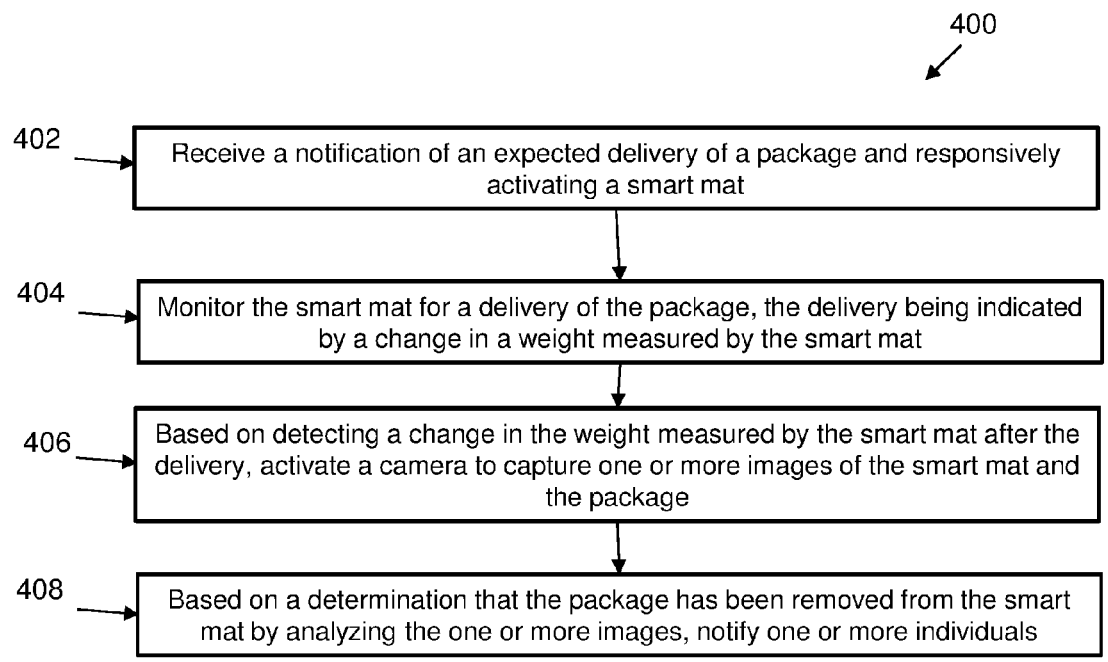
FIG. 5 depicts a flow diagram of a method for monitoring delivered packages in accordance with another embodiment of the present invention.

FIG. 5 depicts a flow diagram of a method 400 for monitoring delivered packages in accordance with another embodiment of the present invention. As shown at block 402, the method 400 includes receiving a notification of an expected delivery of a package and responsively activating a smart mat. In exemplary embodiments, the notification can include a weight and a size of the package. Next, as shown at block 404, the method 400 includes monitoring the smart mat for a delivery of the package, the delivery being indicated by a change in a weight measured by the smart mat. The method also includes activating a camera to capture one or more images of the smart mat and the package based at least in part on detecting a change in the weight measured by the smart mat after the delivery, as shown at block 406. Next, based on a determination that the package has been removed from the smart mat by analyzing the one or more images, the method 400 includes notifying one or more individuals, as shown at block 408. In one embodiment, analyzing the one or more images comprises performing image subtraction on the one or more images. In one embodiment, notifying the one or more individuals includes transmitting a notification including a location of the smart mat and an image of the package and the smart mat captured by the camera when the package was removed from the smart mat.

The method 400 can also include notifying the one or more individuals of a potential delivery exception based on a determination that the change in the weight measured by the smart mat at the delivery of the package is not equal to the package weight. In exemplary embodiments, the one or more individuals that are notified that the package has been removed from the smart mat are determined based on a determination of whether the image subtraction indicates a presence of a person when the package was removed from the smart mat. In exemplary embodiments, the one or more individuals that are notified that the package has been removed from the smart mat are determined based on a user profile for a user of the smart mat.

Alternate embodiments can use ultrasonic (acoustic) sensors or optical sensors (e.g., lidar), which use sound and light respectively to create images in place of a camera, and image subtraction can be used on the images generated from ultrasonic sensors or lidar.

It should be appreciated that while embodiments herein refer to a processing system or mobile device for monitoring delivered packages, this is for exemplary purposes and the claims should not be so limited. In other embodiments, the monitoring of the delivered packages may be performed by a plurality of computing devices, a distributed computing environment or a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
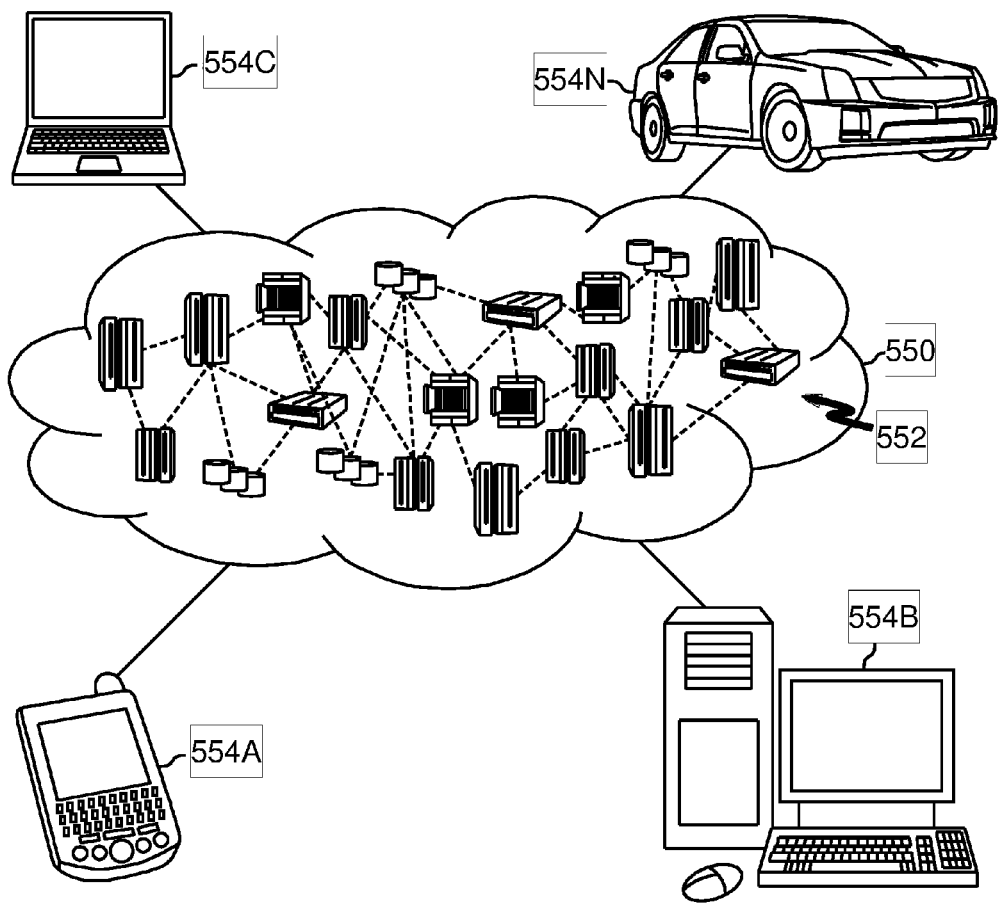
FIG. 6 depicts a cloud computing environment according to an embodiment of the present invention.

Referring now to FIG. 6, illustrative cloud computing environment 550 is depicted. As shown, cloud computing environment 550 comprises one or more cloud computing nodes 552 with which local computing devices used by cloud consumers, such as, for example, personal digital assistant (PDA) or cellular telephone 554A, desktop computer 554B, laptop computer 554C, and/or automobile computer system 554N may communicate. Nodes 552 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 6 are intended to be illustrative only and that computing nodes 552 and cloud computing environment 550 can communicate with any type of computerized device over any type of network and/or network addressable connection (e.g., using a web browser).

Figure 7:
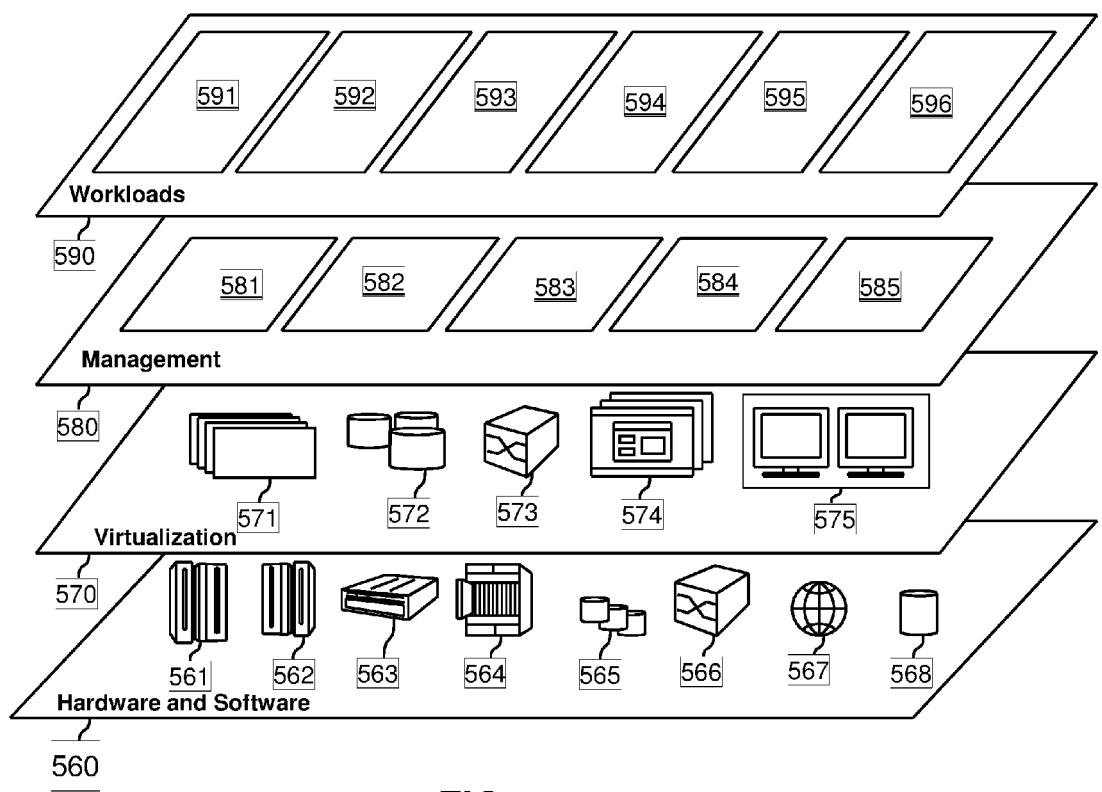
FIG. 7 depicts abstraction model layers according to an embodiment of the present invention.

Referring now to FIG. 7, a set of functional abstraction layers provided by cloud computing environment 550 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provides pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and package monitoring system 596. The package monitoring system 596 may perform one or more methods for monitoring delivered packages, such as but not limited to the methods described in reference to FIGS. 4 and 5 for example.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for monitoring delivered packages, the method comprising:
receiving, from a shipping information system, a first notification of an expected delivery of a package and responsively activating a smart mat;
monitoring the smart mat for a delivery of the package, the delivery being indicated by a change in a weight measured by the smart mat;
based at least in part on detecting a change in the weight measured by the smart mat after the delivery, activating a camera to capture one or more images of the smart mat and the package; and
based on a determination that the package has been removed from the smart mat by analyzing the one or more images, notifying one or more individuals with a second notification.

2. The method of claim 1, wherein the first notification includes a package weight and a package size of the package.

3. The method of claim 2, further comprising notifying the one or more individuals of a potential delivery exception based on a determination that the change in the weight measured by the smart mat at the delivery of the package is not equal to the package weight.

4. The method of claim 1, wherein analyzing the one or more images comprises performing image analysis on the one or more images.

5. The method of claim 4, wherein said image analysis is performed using image subtraction.

6. The method of claim 4, wherein the one or more individuals that receive the second notification that the package has been removed from the smart mat are determined based on a determination of whether the image analysis indicates a presence of a person when the package was removed from the smart mat.

7. The method of claim 1, wherein the second notification that notifies the one or more individuals includes transmitting a notification including a location of the smart mat and an image of the package and the smart mat captured by the camera when the package was removed from the smart mat.

8. The method of claim 1, wherein the one or more individuals that are notified by the first or second notifications are determined based on a user profile for a user of the smart mat.

9. A system for monitoring delivered packages, the system comprising:
a memory;
a processor communicatively coupled to the memory, wherein the processor is configured to:
receive, from a shipping information system, a first notification of an expected delivery of a package and responsively activating a smart mat;
monitor the smart mat for a delivery of the package, the delivery being indicated by a change in a weight measured by the smart mat;
based at least in part on detecting a change in the weight measured by the smart mat after the delivery, activate a camera to capture one or more images of the smart mat and the package; and
based on a determination that the package has been removed from the smart mat by analyzing the one or more images, notify one or more individuals with a second notification.

10. The system of claim 9, wherein the first notification includes a package weight and a package size of the package.

11. The system of claim 10, wherein the processor is further configured to notify the one or more individuals of a potential delivery exception based on a determination that the change in the weight measured by the smart mat at the delivery of the package is not equal to the package weight.

12. The system of claim 9, wherein analyzing the one or more images comprises performing image analysis on the one or more images.

13. The system of claim 12, wherein the one or more individuals that receive a second notification that the package has been removed from the smart mat are determined based on a determination of whether the image analysis indicates a presence of a person when the package was removed from the smart mat.

14. The system of claim 9, wherein the second notification that notifies the one or more individuals includes transmitting a notification including a location of the smart mat and an image of the package and the smart mat captured by the camera when the package was removed from the smart mat.

15. The system of claim 9, wherein the one or more individuals that are notified by the first or second notifications are determined based on a user profile for a user of the smart mat.

16. A computer program product comprising a computer readable storage medium having program instructions embodied therewith, the program instructions executable by a processor to cause the processor to perform a method comprising:
receiving, from a shipping information system, a first notification of an expected delivery of a package and responsively activating a smart mat;

monitoring the smart mat for a delivery of the package, the delivery being indicated by a change in a weight measured by the smart mat;

based at least in part on detecting a change in the weight measured by the smart mat after the delivery, activating a camera to capture one or more images of the smart mat and the package; and based on a determination that the package has been removed from the smart mat by analyzing the one or more images, notifying one or more individuals with a second notification.

17. The computer program product of claim 16, wherein the first notification includes a package weight and a package size of the package.

18. The computer program product of claim 17, wherein the method further comprises notifying the one or more individuals of a potential delivery exception based on a determination that the change in the weight measured by the smart mat at the delivery of the package is not equal to the package weight.

19. The computer program product of claim 16, wherein analyzing the one or more images comprises performing image analysis on the one or more images.

20. The computer program product of claim 19, wherein the one or more individuals that receive a second notification that the package has been removed from the smart mat are determined based on a determination of whether the image analysis indicates a presence of a person when the package was removed from the smart mat.

\* \* \* \* \*